United States Patent
Xu et al.

(10) Patent No.: US 7,366,671 B2
(45) Date of Patent: Apr. 29, 2008

(54) SPEECH DISPLAYING SYSTEM AND METHOD

(75) Inventors: Jenny Xu, Taipei (TW); Chaucer Chiu, Taipei (TW)

(73) Assignee: Inventec Corporation (TW)

( * ) Notice: Subject to any disclaimer, the term of this patent is extended or adjusted under 35 U.S.C. 154(b) by 674 days.

(21) Appl. No.: 11/005,911

(22) Filed: Dec. 6, 2004

(65) Prior Publication Data

US 2006/0074690 A1    Apr. 6, 2006

(30) Foreign Application Priority Data

Sep. 29, 2004    (TW) .............................. 93129383 A

(51) Int. Cl.
*G10L 21/06*       (2006.01)

(52) U.S. Cl. ...................... 704/270; 704/276; 704/277; 704/231; 704/235; 704/3; 725/137

(58) Field of Classification Search ................ 704/235, 704/278, 276, 231, 9, 257, 270, 3, 251, 260; 386/97; 725/137
See application file for complete search history.

(56) References Cited

U.S. PATENT DOCUMENTS 5,151,998 A * 9/1992 Capps ........................ 704/278
5,220,611 A * 6/1993 Nakamura et al. ........... 704/278
5,677,739 A * 10/1997 Kirkland ..................... 348/468
6,535,269 B2 * 3/2003 Sherman et al. ............... 352/6
7,130,790 B1 * 10/2006 Flanagan et al. ............... 704/2
2004/0093220 A1 * 5/2004 Kirby et al. ................. 704/278

* cited by examiner

*Primary Examiner*—Nick Corsaro
*Assistant Examiner*—Benjamin E Gaddy
(74) *Attorney, Agent, or Firm*—Peter F. Corless; Steven M. Jensen; Edwards Angell Palmer & Dodge LLP

(57) ABSTRACT

A speech displaying system and method can display playing progress by waveform and synchronously display text of a speech file using rolling subtitles when playing the speech file. After the speech file is loaded via a loading module, a sentence unit determining module partitions content of the speech file into a plurality of sentence units to produce a list of sentence units. A subtitle highlighting speed calculating module calculates a speed of highlighting every single letter or character contained in the subtitles in the sentence unit index for a sentence unit. A subtitle rolling module displays content of the list of sentence units. When the speech file is played, the subtitles in the sentence unit index are clearly marked, and every letter or character of the subtitles is highlighted. A waveform displaying module marks positions of sentence pauses and playing progress on an oscillogram for the speech file by lines.

6 Claims, 2 Drawing Sheets

SPEECH DISPLAYING SYSTEM AND METHOD

FIELD OF THE INVENTION

The present invention relates to speech displaying systems and methods, and more particularly, to a speech displaying system and method for displaying playing progress by waveform and synchronously displaying text of a speech file using rolling subtitles when playing the speech file.

BACKGROUND OF THE INVENTION

Currently, an electronic device having a displaying unit for displaying speech, or software applicable to output of the displaying unit, generally provides a function of sentence by sentence guidance, and only a few are designed to display playing progress using waveform. However, none of the electronic devices and software may interactively display text using synchronously rolling subtitles (such as subtitle displaying of karaoke) or has an interface for immediate translation and edition, such that it is not easy for a user to practice and interact with subtitles.

Therefore, the problem to be solved here is to provide a speech displaying system and method, which can highlight and prompt content text of a speech file in a subtitle displaying section in a sentence by sentence manner when playing the speech file, and highlight every letter or character according to a playing speed (a loud-reading mode), so as to provide a function of word by word and sentence by sentence guidance for a user to conveniently practice with rolling subtitles.

SUMMARY OF THE INVENTION

In light of the above prior-art drawbacks, a primary objective of the present invention is to provide a speech displaying system and method, which can display playing progress by waveform and synchronously display text of a speech file using rolling subtitles when playing the speech file.

Another objective of the present invention is to provide a speech displaying system and method, which can highlight and prompt content text of a speech file in a subtitle displaying section in a sentence by sentence manner when playing the speech file, and highlight every letter or character according to a playing speed (a loud-reading mode), so as to provide a function of word by word and sentence by sentence guidance for a user to conveniently practice with rolling subtitles.

In accordance with the above and other objectives, the present invention proposes a speech displaying system, comprising a loading module, a sentence unit determining module, a sentence unit editing module, a translation module, a proofreading module, a subtitle highlighting speed calculating module, a subtitle rolling module, and a waveform displaying module. The loading module is used to load a digital speech file. The sentence unit determining module is used to determine text content of the speech file and partition the content into a plurality of sentence units to thereby produce a list of sentence units and a database thereof. The list of sentence units records information of the partitioned text content of the speech file such as a sentence unit index, playing time of sentence units, and subtitles in the sentence unit index, and can store its database in the speech file such that the information of the sentence unit index is ready for use when the speech file is re-loaded next time. The proofreading module serves to proofread the content of the speech file and compare the playing time of the speech file with the pause time of a sentence unit shown in the list of sentence units to obtain information of subtitles in the sentence unit index for the sentence unit. The subtitle highlighting speed calculating module serves to calculate a speed of highlighting every single letter or character of the subtitles in the sentence unit index for the sentence unit. The subtitle highlighting speed calculating module calculates an average speed of highlighting the letter or character of the subtitles in the sentence unit index for the sentence unit by dividing a time interval between two sentence pauses shown in the list of sentence units by the number of letters or characters contained in the subtitles for the sentence unit. The sentence unit editing module can pop up an editing window for a user to edit the subtitles in the sentence unit index in a sentence by sentence manner via the editing window or optionally replace the subtitles with a predetermined subtitle document. The translation module serves to translate the text content of the subtitles in the sentence unit index to other foreign languages according to the user's requirements. For example, English subtitles in a sentence unit index of an English speech file can be translated into Chinese subtitles, and the subtitles of both the original language and the foreign language are stored in the speech file. The subtitle rolling module is used to display text of the sentence unit index and text of the subtitles in the sentence unit index in the list of sentence units. When the speech file is played, the subtitles in the sentence unit index can be clearly marked in a sentence by sentence manner, and every letter or character of the subtitles can be highlighted according to a playing (loud-reading) speed. Alternatively, the original subtitles can be changed to the translated subtitles that would be synchronously rolled and displayed. In another preferred embodiment of the present invention, after subtitles in a sentence unit index of an English speech file have been translated into Chinese subtitles, the translated Chinese subtitles can be clearly marked to display the whole paragraph of Chinese sentences being read aloud. Finally, the waveform displaying module can display an oscillogram of whole speech data in the speech file, and mark positions of sentence pauses and playing progress on the oscillogram by lines.

The subtitle rolling module and the waveform displaying module can synchronously display speech information on a displaying unit.

The present invention also proposes a speech displaying method applicable to the foregoing speech displaying system, comprising the steps of: (1) loading a digital speech file via a loading module; (2) determining text content of the speech file and partitioning the content into a plurality of sentence units via a sentence unit determining module, such that a list of sentence units for recording information of the partitioned content of the speech file such as a sentence unit index, playing time of sentence units, and subtitles in the sentence unit index, and a database of the list of sentence units are produced and stored in the speech file; (3) determining whether a sentence unit editing module is actuated by a user; if yes, popping up an editing window for the user to edit the subtitles in a sentence by sentence manner via the editing window or replace the subtitles with a predetermined subtitle document, and then going to step (4); if no, storing content of the list of sentence units in the speech file, and then going to step (5); (4) determining whether a translation module is actuated by the user; if yes, allowing the user to have text of the subtitles in the sentence unit index being translated into a foreign language, and storing the subtitles of both the original language and the foreign language in the speech file, and then going to step (5); if no, going to step (5); (5) actuating a proofreading module to proofread the content of the speech file and compare playing time of the speech file with pause time of a sentence unit shown in the list of sentence units, so as to obtain information of subtitles in the sentence unit index for the sentence unit and display the subtitles for the sentence unit; (6) dividing via a subtitle highlighting speed calculating module a time interval between two sentence pauses shown in the list of sentence units by the number of letters or characters contained in the subtitles in the sentence unit index for the sentence unit so as to calculate an average speed of highlighting every single letter or character contained in the subtitles in the sentence unit index for the sentence unit; (7) displaying text of the sentence unit index and text of the subtitles in the sentence unit index in the list of sentence units via a subtitle rolling module, such that when the speech file is played, the subtitles in the sentence unit index are clearly marked in a sentence by sentence manner, and every single letter or character of the subtitles is highlighted according to a playing (loud-reading) speed, or the original subtitles are changed to the translated subtitles that are synchronously rolled and displayed; and (8) displaying an oscillogram of whole speech data in the speech file and marking positions of sentence pauses and playing progress on the oscillogram by lines via a waveform displaying module.

According to the speech displaying system and method proposed in the present invention, playing progress can be displayed on the displaying unit by waveform and the text of the speech file can be synchronously displayed using rolling subtitles when playing the speech file, such that a function of word by word and sentence by sentence guidance as well as a translation function can be provided for the user to practice more conveniently with the rolling subtitles.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
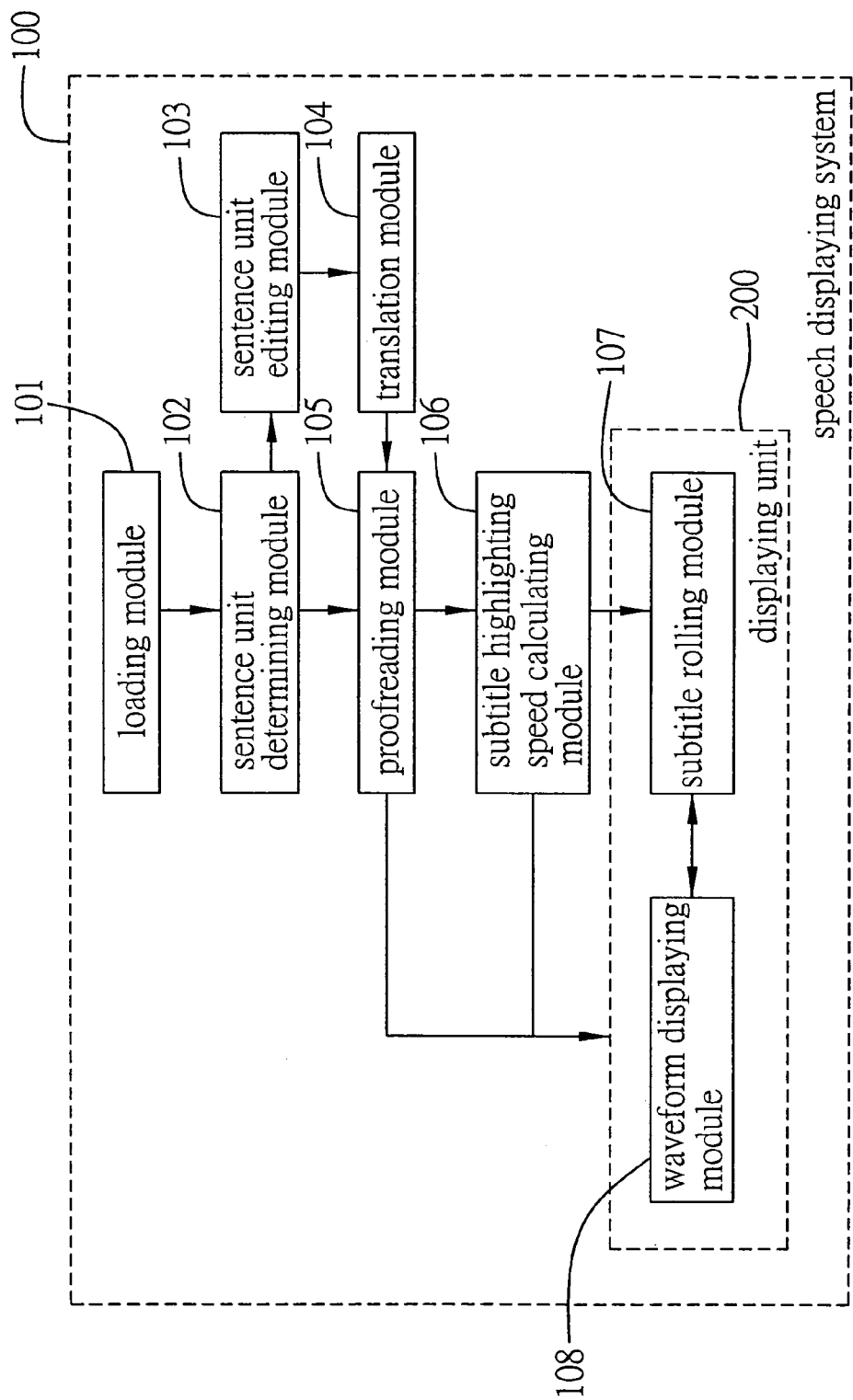
FIG. 1 is a schematic diagram showing systemic architecture of a speech displaying system according to the present invention.

FIG. 1 is a schematic diagram showing systemic architecture of a speech displaying system 100 according to the present invention. The speech displaying system 100 comprises a loading module 101, a sentence unit determining module 102, a sentence unit editing module 103, a translation module 104, a proofreading module 105, a subtitle highlighting speed calculating module 106, a subtitle rolling module 107, and a waveform displaying module 108.

The loading module 101 serves to load a digital speech file such as a MP3 (MPEG Audio Layer-3) file.

The sentence unit determining module 102 is used to determine text content of the speech file and partition the content into a plurality of sentence units to thereby produce a list of sentence units and a database thereof. The list of sentence units records information of the partitioned text content of the speech file such as a sentence unit index, playing time of sentence units, and subtitles in the sentence unit index, and can store its database in the speech file such that the information of the sentence unit index is ready for use when the speech file is re-loaded next time.

The sentence unit editing module 103 can pop up an editing window for a user to edit the subtitles in the sentence unit index in a sentence by sentence manner via the editing window or optionally replace the subtitles with a predetermined subtitle document.

The translation module 104 serves to translate text content of the subtitles in the sentence unit index into other foreign languages according to the user's requirements. For example, English subtitles in a sentence unit index of an English speech file can be translated into Chinese subtitles, and both the original subtitles and the translated subtitles are stored in the speech file.

The proofreading module 105 is used to proofread the content of the speech file and compare the playing time of the speech file with the pause time of a sentence unit shown in the list of sentence units so as to obtain information of subtitles in the sentence unit index for the sentence unit.

The subtitle highlighting speed calculating module 106 serves to calculate a speed of highlighting every single letter or character of the subtitles in the sentence unit index for the sentence unit. The subtitle highlighting speed calculating module divides a time interval between two sentence pauses shown in the list of sentence units by the number of letters or characters contained in the subtitles in the sentence unit index for the sentence unit so as to calculate an average speed of highlighting the letter or character of the subtitles in the sentence unit index for the sentence unit.

The subtitle rolling module 107 serves to display text of the sentence unit index and text of the subtitles in the sentence unit index in the list of sentence units. When the speech file is played, the subtitles in the sentence unit index would be clearly marked by an obvious color in a sentence by sentence manner, and every letter or character of the subtitles can be highlighted according to the playing (loud-reading) speed. Alternatively, the original subtitles can be changed to the translated subtitles that would be synchronously rolled and displayed.

The waveform displaying module 108 is used to display an oscillogram of whole speech data in the speech file, and mark positions of sentence pauses and playing progress on the oscillogram by lines.

The subtitle rolling module 107 and the waveform displaying module 108 can be mounted in a displaying unit 200 of the speech displaying system 100, and synchronously display speech information on the displaying unit 200.

Figure 2:
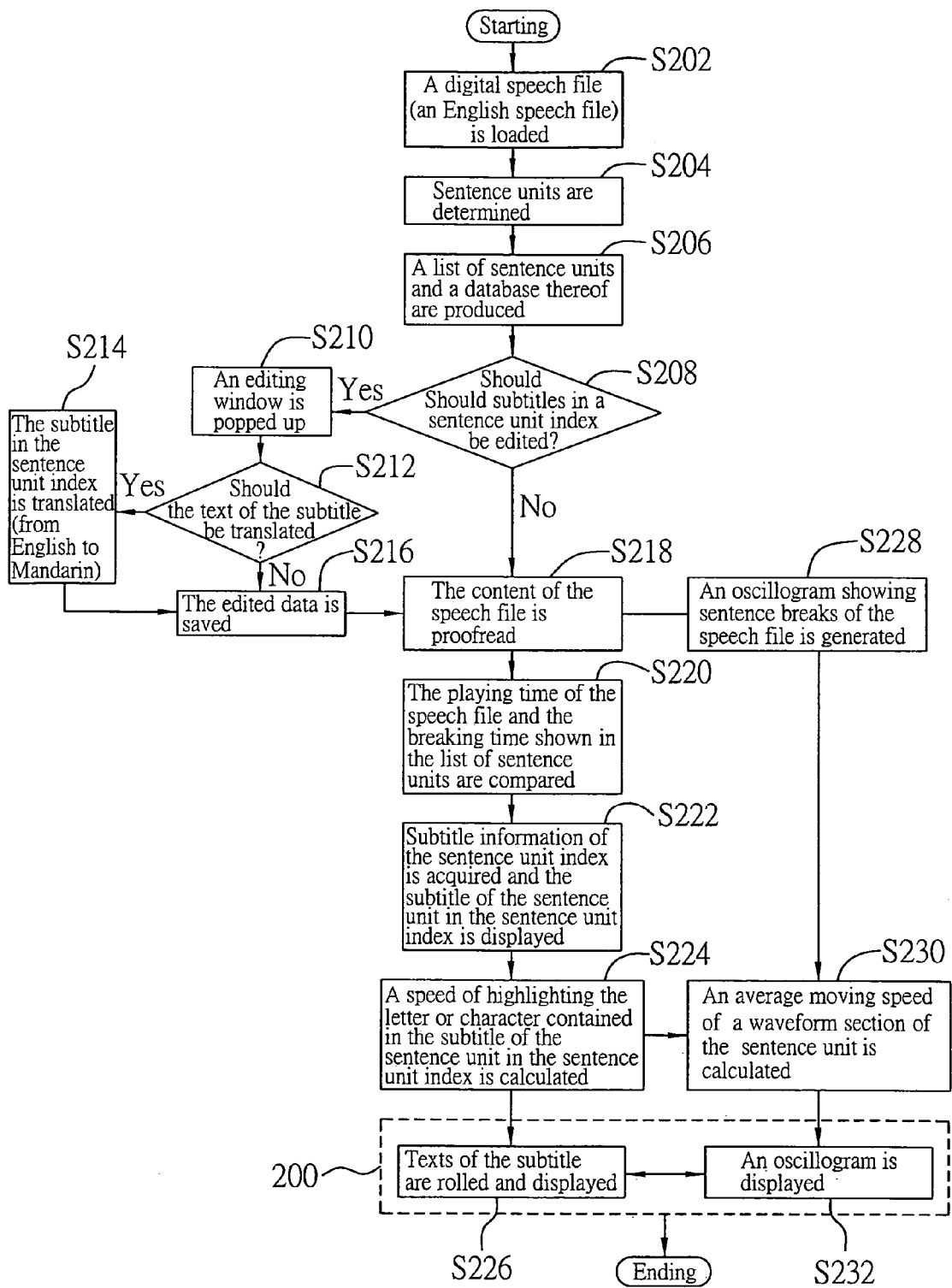
FIG. 2 is a flowchart showing a speech displaying method according to a preferred embodiment of the present invention.

FIG. 2 is a flowchart showing a speech displaying method according to a preferred embodiment of the present invention. First in step S202, an English digital speech file such as a MP3 file is loaded by a user via the loading module 101. Then, the method proceeds to step S204.

In step S204, the sentence unit determining module 102 performs automatic sentence pause determination on the loaded English speech file to determine text content of the speech file and partition the content into a plurality of sentence units. Then, the method proceeds to step S206. In step S206, a list of sentence units and a database thereof are produced. The list of sentence units records information of the partitioned text content of the speed file such as a sentence unit index, playing time of sentence units, and subtitles in the sentence unit index, and can store its database in the speech file such that the information of the sentence unit index is ready for use when the speech file is re-loaded next time. Subsequently, the method proceeds to step S208.

In step S208, it determines whether the user intends to edit content of the produced list of sentence units or not. If yes, the method proceeds to step S210; if no, the method proceeds to step S218 to proofread the content of the speech file.

In step S210, the sentence unit editing module 103 pops up an editing window for the user to edit the subtitles in the sentence unit index in a sentence by sentence manner via the editing window or optionally replace the subtitles with a predetermined subtitle document. Then, in step S212, it asks the user that whether text of the subtitles in the sentence unit index is to be translated or not. If yes, the method proceeds to step S214. If no, the method proceeds to step S216 where the edited data are stored in the speech file, and then proceeds to step S218 to proofread the content of the speech file.

In step S214, the translation module 104 translates the text content of the subtitles in the sentence unit index into a foreign language according to the user's requirement. In this embodiment, English subtitles in the sentence unit index of the English speech file can be translated into Chinese subtitles. Then, the method proceeds to step S216 where the subtitles of both the original language and the foreign language are stored in the speech file. Subsequently, the method proceeds to step S218 to proofread the content of the speech file.

In step S218, the content of the speech file is proofread by the proofreading module 105. Then, the method proceeds to step S220 to compare the playing time of the speech file with the pause time of a sentence unit shown in the list of sentence units. Subsequently, the method proceeds to step S222 to obtain information of subtitles in the sentence unit index for the sentence unit and display the subtitles for the sentence unit. Afterwards, the method proceeds to step S224.

In step S224, the subtitle highlighting speed calculating module 106 calculates a speed of highlighting every single letter or character of the subtitles in the sentence unit index for the sentence unit. The subtitle highlighting speed calculating module 106 divides a time interval between two sentence pauses shown in the list of sentence units by the number of letters or characters contained in the subtitles for the sentence unit to calculate an average speed of highlighting the letter or character of the subtitles in the sentence unit index for the sentence unit. The two sentence pauses indicate the pause time of two sentence units. For example, if the pause time of sentence unit 1 and sentence unit 2 is respectively 00:02.855 seconds and 00:06.278 seconds, the subtitle highlighting speed calculating module 106 is able to substitute these values into formulae to calculate the displaying time of the letter or character of the subtitles for the sentence unit 2 to be 3.42 seconds. Then, the average speed of highlighting the letter or character of the subtitles in the sentence unit index for the sentence unit is calculated by dividing the displaying time by the number of letters or characters contained in the subtitles for the sentence unit. For example, if the subtitles in the sentence unit index for the sentence unit 2 contain 10 letters or characters, the average displaying time of the subtitles for the sentence unit 2 is 0.342 seconds (3.42/10=0.342 seconds). In other words, the displaying time of highlighting each letter or character in the subtitles for the sentence unit 2 is 0.342 seconds. After calculating the speed of highlighting the letter or character in the subtitles for the sentence unit, the method proceeds to step S226 and then transmits the calculated value to step S230 (described later).

In step S226, the subtitle rolling module 107 displays text of the sentence unit index and text of the subtitles in the sentence unit index in the list of sentence units. When the speech file is played, the subtitles in the sentence unit index would be clearly marked by an obvious color in a sentence by sentence manner, and every letter or character of the subtitles is highlighted according to the playing (loud-reading) speed. The displaying time of highlighting each letter or character in the subtitles is obtained from the value calculated by the subtitle highlighting speed calculating module 106 in the step S224. If the user has previously performed the step S214 and translated the text of the subtitles in the sentence unit index, in this step S226 the original subtitles can be changed to the translated subtitles that would be synchronously rolled and displayed.

Further, information of sentence pause time in the list of sentence units is transmitted to step S228 during proofreading the content of the speech file in the step S218. In step S228, the waveform displaying module 108 generates an oscillogram of whole speech data in the speech file and marks positions of sentence pauses on the oscillogram by lines. Then, the method proceeds to step S230.

In step S230, the waveform displaying module 108 calculates an average moving speed of a waveform section of the sentence unit according to the value calculated by the subtitle highlighting speed calculating module 106 in the step S224, such that playing progress and the text of the speech file can be synchronously displayed by the waveform displaying module 108 and the subtitle rolling module 107, respectively. Subsequently, the method proceeds to step S232 to display the complete oscillogram by the waveform displaying module 108.

Moreover, the subtitle rolling module 107 and the waveform displaying module 108 can synchronously display speech information on the displaying unit 200 in the steps S226 and S232, respectively.

Therefore, according to the speech displaying system and method proposed in the present invention, after a speech file is loaded via the loading module, playing progress can be displayed on the displaying unit by waveform and text of the speech file can be synchronously displayed using rolling subtitles when playing the speech file, such that a function of word by word and sentence by sentence guidance can be provided for the user to practice more conveniently with the rolling subtitles.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A speech displaying system, comprising:
a loading module for loading a speech file;
a sentence unit determining module for determining text content of the speech file and partitioning the content into a plurality of sentence units, such that a list of sentence units comprising information of at least one of a sentence unit index, playing time of sentence units, and subtitles in the sentence unit index, and a database of the list of sentence units are produced, wherein the list of sentence units and the database are stored in the speech file;

a sentence unit editing module for editing the subtitles in the sentence unit index in a sentence by sentence manner and storing the edited subtitles in the speech file;

a translation module for translating text content of the subtitles in the sentence unit index into a foreign language and storing the subtitles of both the original language and the foreign language in the speech file;

a proofreading module for proofreading the content of the speech file;

a subtitle highlighting speed calculating module for calculating a speed of highlighting every letter or character of the subtitles in the sentence unit index for a sentence unit;

a subtitle rolling module for displaying text of the sentence unit index and text of the subtitles in the sentence unit index in the list of sentence units, wherein the subtitles in the sentence unit index are clearly marked in a sentence by sentence manner, and every letter or character of the subtitles is highlighted according to a playing speed of the speech file; and a waveform displaying module for displaying an oscillogram of whole speech data in the speech file, and marking positions of sentence pauses and playing progress on the oscillogram by lines.

2. The speech displaying system of claim 1, wherein the subtitle highlighting speed calculating module dividing a time interval between two sentence pauses shown in the list of sentence units by the number of letters or characters contained in the subtitles in the sentence unit index for the sentence unit so as to calculate the speed of highlighting every letter or character of the subtitles in the sentence unit index for the sentence unit.

3. The speech displaying system of claim 1, wherein the subtitle rolling module is able to switch the original subtitles to the translated subtitles, and synchronously roll and display the translated subtitles.

4. The speech displaying system of claim 1, wherein the waveform displaying module comprises a plurality of lines for pauses of the content of the speech file and an average speed line for displaying the playing speed and playing progress.

5. A speech displaying method applicable to a speech displaying system, comprising the steps of:

(1) loading a digital speech file via a loading module of the speech displaying system;

(2) determining text content of the speech file and partitioning the content into a plurality of sentence units via a sentence unit determining module of the speech displaying system, such that a list of sentence units for recording information of the partitioned content of the speech file including at least one of a sentence unit index, playing time of sentence units, and subtitles in the sentence unit index, and a database of the list of sentence units are produced and stored in the speech file;

(3) determining whether a sentence unit editing module of the speech displaying system is actuated by a user; if yes, popping up an editing window for the user to edit the subtitles in a sentence by sentence manner via the editing window or replace the subtitles with a predetermined subtitle document, and then going to step (4); if no, storing content of the list of sentence units in the speech file, and then going to step (5);

(4) determining whether a translation module of the speech displaying system is actuated by the user; if yes, allowing the user to have text of the subtitles in the sentence unit index being translated into a foreign language, and storing the subtitles of both the original language and the foreign language in the speech file, and then going to step (5); if no, going to step (5);

(5) actuating a proofreading module of the speech displaying system to proofread the content of the speech file and compare playing time of the speech file with pause time of a sentence unit shown in the list of sentence units, so as to obtain information of the subtitles in the sentence unit index for the sentence unit and display the subtitles for the sentence unit;

(6) dividing via a subtitle highlighting speed calculating module of the speech displaying system a time interval between two sentence pauses shown in the list of sentence units by the number of letters or characters contained in the subtitles in the sentence unit index for the sentence unit so as to calculate an average speed of highlighting every letter or character of the subtitles in the sentence unit index for the sentence unit;

(7) displaying text of the sentence unit index and text of the subtitles in the sentence unit index in the list of sentence units via a subtitle rolling module of the speech displaying system, such that when the speech file is played, the subtitles in the sentence unit index are clearly marked in a sentence by sentence manner, and every letter or character of the subtitles is highlighted according to a playing speed, or the original subtitles are changed to the translated subtitles that are synchronously rolled and displayed; and (8) displaying an oscillogram of whole speech data in the speech file and marking positions of sentence pauses and playing progress on the oscillogram by lines via a waveform displaying module of the speech displaying system.

6. The speech displaying method of claim 5, wherein the waveform displaying module comprises a plurality of lines for pauses of the content of the speech file and an average speed line for displaying the playing speed and playing progress.

* * * * *